Sept. 13, 1949. W. H. COLBERT ET AL 2,482,054
MIRROR STRUCTURE HAVING A METAL TO GLASS
ADHERENCE INCREASING INTERLAYER
Filed June 24, 1944
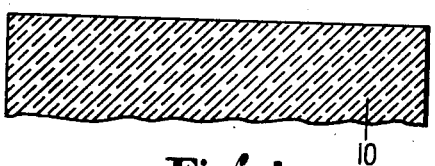
Fig. 1
Fig. 2
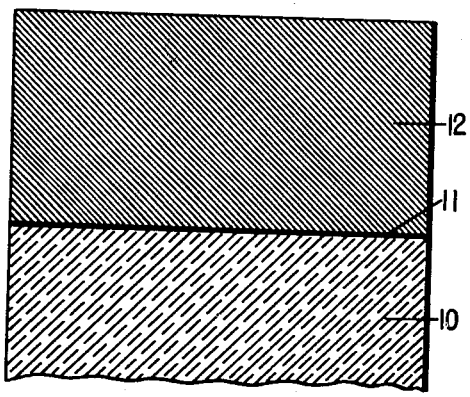
Fig. 3
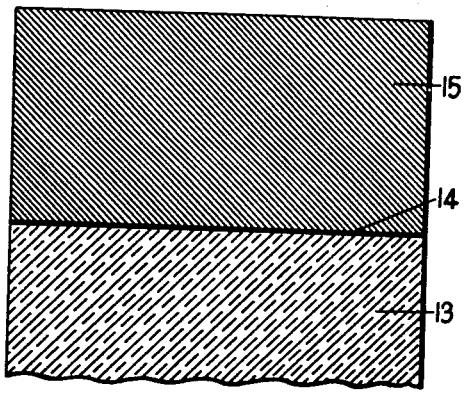
Fig. 4
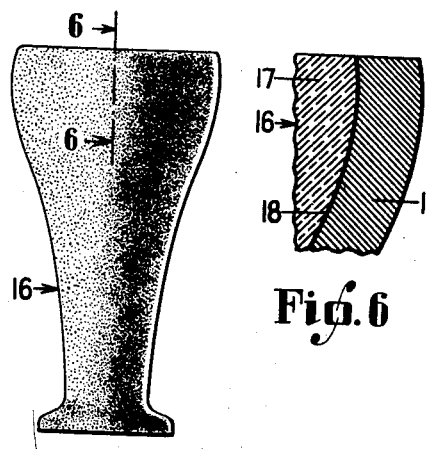
Fig. 5
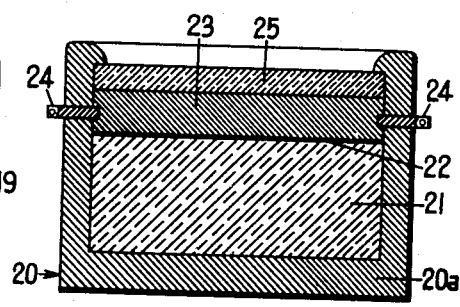
Fig. 7
Fig. 6
INVENTORS
William H. Colbert
Arthur R. Weinrich.
Willard L. Morgan.
BY Corbett, Mahoney & Miller
ATTORNEYS Patented Sept. 13, 1949

2,482,054

UNITED STATES PATENT OFFICE 2,482,054

MIRROR STRUCTURE HAVING A METAL TO GLASS ADHERENCE INCREASING INTERLAYER

William H. Colbert and Arthur R. Weinrich, Brackenridge, Pa., and Willard L. Morgan, Columbus, Ohio, assignors to Libbey-Owens-Ford Glass Company, Toledo, Ohio, a corporation of Ohio Application June 24, 1944, Serial No. 541,964

10 Claims. (Cl. 88—105)

This invention relates to strongly adherent metallic coated articles and means for producing the same. It comprises a means of securing a high degree of adhesion of metallic or reflective coatings to glass, porcelain, silica, mica, or other silicates or silica-containing surfaces, and has to do, more particularly, with the use of an extremely thin layer of a metallic compound such as a metallic oxide, sulfide, sulfate or halide such as a chloride, bromide, iodide, or fluoride, as the adhesive in the application of reflective, photochemical, or other types of metallic coatings on these materials.

Reflective articles such as mirrors are commonly made by the application to glass of metallic reflective materials such as copper, silver, gold, aluminum, chromium, platinum and rhodium. Most of these materials do not actually adhere to the glass and in forming mirrors such as silver mirrors the silver is not at all stuck to the glass but is merely laid closely to the surface and held to the glass in intimate contact largely by the pressure of the atmosphere. Consequently, any localized force removes the mirror layer such as aluminum, silver, copper or gold away from the surface, causing pin holes and finally "let-goes" or "blisters" throughout the mirror. In such cases the utility of the mirror is destroyed and it rapidly disintegrates. While attempts have been made in the past to protect such mirror coatings on glass from the effects of the atmosphere and more particularly from abrasion and rubbing of the mirror film off the glass, these attempts have generally followed the direction of applying a protective lacquer or shellac coating. Such coatings, or paint coatings which are also used, however, tend to contract during the drying and formation of the protective coating film and they further contract and expand with the humidity in the atmosphere. Such contractions or expansions in the protective films are sufficient to cause localized strains or pulling effects and often the use of such lacquers or other coatings, rather than resulting in an increase in the life of the mirrors, has been found to lead to an early destruction of the mirror by pulling the mirror coating away from the glass.

We propose to overcome the difficulties arising from lack of adhesion within glass or other mirrors and the similar difficulties experienced with many other coatings applied to glass for other purposes, such as metallic coatings deposited upon glass supports in order to produce photoelectric surfaces or electrical resistances. We have found that various metallic compounds in contrast to the metals are highly adherent to glass and that extremely thin layers of these, which are also adherent to the metal coatings to be applied to glass, can be used to secure highly adherent products, exhibiting the normally desired optical, electrical or other properties without any, or at least without serious, change.

We have found that the metallic oxides, such as those of lead, silver, aluminum, magnesium, zinc, thorium, and other rare earth metal oxides, and the oxides of cadmium, antimony, bismuth, mercury, copper and other heavy metal oxides, when applied over glass or other siliceous surfaces, are extremely highly adherent to such surfaces and that furthermore they are highly adherent to the metals which may be applied to glass either by chemical deposition, thermal evaporation, sputtering or other means, for the purposes of securing mirrors or other coated articles. In addition we have also found that other metallic compounds may be used as adhesive layers between a metal coating and a silica-containing surface, such as glass. Thus, the metallic compounds which may be looked upon as derivatives of the metallic oxides are generally highly effective and we may use the sulfides, sulfates, bromides, chlorides, iodides, tungstates or other compounds related to the metallic oxides which we have indicated above and derived from the indicated metals. While with ordinary metallic mirrors the coatings can readily be removed from glass by applying adhesive tape to the same and pulling this off, it is found that with our new coated articles, the adhesive tape will not pull the mirror films away from the glass because they are so tightly adhered to the same by our intermediate thin adhesive layers. Furthermore, with the new mirrors and other coated articles, a remarkably improved resistance to moisture is found so that these will withstand, in an unprotected condition, salt spray and humidity tests for considerable periods of time, whereas with the ordinary mirrors and coated articles, the water quickly works between the mirror films and the glass on which it lies and removes the films from the glass. In a similar way the separation difficulties experienced due to tensional pull when protective lacquer, paint or shellac coatings are applied on the back of mirrors, have been overcome, since our reflective coatings are adhered sufficiently tightly to the glass to resist such tensional effects. This permits us a further advantage in that we may now apply, for the purposes of protecting mirrors from corrosive gases such as sulfides, protective coatings of a maximum resistance to atmospheric effects without regard to the coating being one free of tensional pull.

The metallic oxide or other metallic compounds applied as adhesive films need be, and in some cases preferably are, very thin, being only a few molecules thick in some cases and not visible or otherwise detectable. We have found that the thickness of layer necessary to develop adhesive forces needs to be only a few molecules thick and as such the presence of these compounds on the glass may not be detectable by any optical effect. Thus, where we use extremely thin films of oxides or other compounds for the purpose of securing highly adherent mirrors, the mirrors produced by depositing silver or other suitable metal on the glass first covered with a very thin metallic oxide film, are equal in reflectivity and in transmission to similar mirrors made without the very thin oxide or other metallic compound adhesive films. However, we may also use thicker metallic oxide or metallic compound films as an adhesive layer which may even be detected by the slight color they impart to the glass and which may also cut down the reflectivity or transmission of light to some degree in the final produced article. Thus, for example, with a mirror, it is apparent that if our adhesive layers are too thick, the reflectivity properties of a second surface mirror may be seriously or desirably cut down but at the same time it is apparent that the reflection properties of a first surface mirror made in such a way would not particularly be influenced by the thickness of the oxide or adhesion-securing layer. The metallic oxide or metallic sulfide or other metallic compound may be deposited as a coating on the glass by the direct thermal evaporation under normal conditions or within a vacuum, of extremely small amounts of the desired metallic compound. This may also be carried out in accordance with the disclosure of co-pending application Serial Nos. 541,965 and 541,967, the latter now abandoned. In the case of oxide layers, we may produce these in position on the glass by oxidation of extremely thin metallic layers first deposited thereon by thermal evaporation. Thus, we may first evaporate very small amounts of aluminum, tin, lead or copper and then form these into the metallic oxides while on the glass surface. As examples of the compounds we may directly evaporate onto the glass surface by thermal evaporation within a vacuum, we may use lead oxide, cadmium oxide, zinc oxide, zinc sulfide, lead sulfide, antimony oxide, aluminum oxide, lead bromide, magnesium fluoride, silver chloride, or lead tungstate. We may readily form coatings of lead sulfate on glass by first evaporating extremely small amounts of lead sulfide and thereafter oxidizing this on the glass to lead sulfate by exposure to the air.

It is an object of the present invention to produce mirrors or other light reflective or partially light reflective articles in which a film of metal is carried by a smooth surface of vitreous siliceous material characterized by the provision of a superior bond between the vitreous siliceous body and the metal film.

It is a further object of the present invention to provide an article of the character described in which the improved bond between the metal film and the vitreous siliceous body is obtained without sacrificing optical properties and particularly in which the bond is provided by an intermedate layer between the vitreous siliceous body and the metal film and has such physical properties as to substantially completely avoid diffusion of reflected or transmitted light.

It is a further object of the present invention to provide an article in which a reflective or metallized film is firmly and substantially permanently adhered to a supporting surface preferably formed of glass or other siliceous material.

It is a further object of the present invention to provide a transparent, partially transparent, or opaque film of metal in permanently adhered relation to a surface of a support body preferably formed from glass or other siliceous material.

It is a further object of the present invention to provide an improved article in which a metal film is firmly and permanently bonded to a support body by an interposed or intermediate bonding layer.

A further object of the present invention is to provide an improved article in which a metal film is firmly and permanently bonded to a support body by an intermediate transparent bonding layer.

It is a further object of the present invention to provide an improved article in which a metal film is firmly and permanently bonded to a support body by an interposed or intermediate transparent bonding layer which has no optical effect.

It is a feature of the present invention to provide an article of the character described in which an intermediate bonding layer is interposed between a smooth surface of a vitreous siliceous support and a metal light reflecting film in which the bonding layer has a surface in intimate, continuous, surface to surface contact with the smooth surface of the vitreous siliceous body so as to define therewith a smooth continuous interface, the other surface of the bonding layer being of substantially the same smoothness as the smooth surface of the support body; and a metal light reflecting film permanently bonded to said bonding layer, the surface of the metal film adjacent the bonding layer being in intimate continuous surface to surface contact therewith and defining therewith a smooth continuous interface, the other surface of said metal film being of substantially the same smoothness as the smooth surface of the support body.

It is a further feature of the present invention to provide a partially transparent, partially light reflecting article of the type described in which the vitreous siliceous support body is transparent and has two smooth continuous surfaces, to one of which the metal film is bonded as aforesaid.

It is a further feature of the present invention to provide an article of the character described which comprises a vitreous siliceous support body having a smooth surface, a very thin bonding layer formed of a metallic oxide permanently bonded to the surface of said support, and a film of metal permanently bonded to the bonding layer.

The above and other objects and advantages of our invention will appear from the following description and appended claims when considered in connection with the accompanying drawings forming a part of this specification wherein like reference characters designate corresponding parts in the several views.

In said drawings:

Figure 1 is a fragmentary sectional view of a piece of glass or other siliceous material.

Figure 2 is a view similar to Figure 1 showing the glass or other siliceous material having a thin film or coating of a metallic compound.

Figure 3 is a fragmentary sectional view of the article of Figure 2 having a semi-transparent reflective metallic film on its surface.

Figure 4 is a view similar to Figure 3 showing the article having an opaque metallic surface film.

Figure 5 is an elevational view of a porcelain or earthenware article, such as a vase or the like, made in accordance with our method.

Figure 6 is a fragmentary detail sectional view taken substantially along the line 6—6 of Figure 5, looking in the direction of the arrows; and Figure 7 is a vertical sectional view of a photoelectric cell made in accordance with our method and embodying the present invention.

Before explaining in detail the present invention it is to be understood that the invention is not limited in its application to the details of construction and arrangements of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring now particularly to Figures 1, 2 and 3 of the drawings, there are illustrated certain steps of making one type or kind of article or object in accordance with the method or process of our invention, Figure 3 showing the article resulting from said method.

In Figure 1 we have shown a support article, such as a piece of glass or other siliceous material 10, to which a surface coating is to be applied in a manner to be described hereinafter. To one face of the support 10 there is applied a relatively thin adhesive or bonding layer 11 of a suitable metallic compound, as seen in Figure 2.

In Figure 3, a metal film 12 is shown as applied over the metallic compound layer 11, the latter being of such a nature as to cause the film 12 to firmly and substantially permanently adhere to the support article or piece 10. The film 12 may be in the nature of a semi-transparent reflective metallic film, if desired. The layer 11 is of such a thickness and nature as to have absolutely no optical effect or of some greater thickness where desired.

In Figure 4, a support piece or base 13, such as glass, quartz, or other siliceous material, has applied to one face thereof a relatively thin layer 14 of a suitable metallic compound over which is applied a somewhat thicker film 15 of some suitable opaque metal. The metallic compound layer 14 causes the film 15 to firmly adhere, substantially permanently, to the support or base 13. The layer 14 may be of such a nature and thickness as to not cause any optical effect, or it may in other cases be thicker and bring optical effects with it as well as provide adhesion of the metal to the support.

In Figures 5 and 6 we have shown the application of our novel method or process to the production of a piece of earthenware or porcelainware having a tightly or strongly adherent coating or covering. As shown, a vase or similar article, shown as a whole at 16, has a body portion 17 which may be formed from porcelain or earthenware, preferably glazed, to the outer surface of which is applied a relatively thin layer 18 of a suitable metallic compound. Laid over this layer 18 is a suitable metallic film or covering 19 which may be partially transparent or opaque and which is caused to firmly or strongly adhere to the surface of the vase body or support article 17 so that said film 19 will be of substantially a permanent nature.

While we have shown, merely by way of illustration, a vase 16, it will be understood that our method or process is equally applicable to the production of coated earthenware or porcelain articles or objects of various kinds, shapes and sizes.

Our improved method or process is also applicable to the production of tightly adherent coatings for various articles and devices. As an illustration, we have shown the application of the method of our invention to the production of a photo-electric cell, as well as the resultant device or article.

The photo-electric cell is shown as a whole at 20 in Figure 7. It comprises, as shown, an open top casing or housing 20a, which may be formed from plastic and within which is located a base piece or body 21 formed from glass or other siliceous material. Applied to the top face or surface of the glass piece 21 is a relatively thin layer 22 of a suitable metallic compound such, for example, as zinc oxide. Laid over this layer 22 and tigtly adhered to the glass 21 by said layer, is a layer of silver 23 with wh..:h electrical contacts or conductors 24 are associated. Overlying the silver layer 23 is a photo-electric layer 25 formed from some suitable material such, for example, as copper oxide.

*Example 1*

By way of example, we may produce an aluminum mirror by first evaporating within a high vacuum approximately 0.0033 gram of aluminum. This was deposited on glass in a vacuum of 10 to the minus 5 millimeters, the glass being 24 inches away from the tungsten filament upon which the aluminum was heated and evaporated. This gave a coating of about .000,066 gram on a square foot of glass and this coating was about 0.0003 micron thick, or a thickness of 3 Angstrom units. The coating was completely invisible and upon exposure to air rapidly oxidized to aluminum oxide. The sheet of glass thus prepared was again placed within a vacuum and 2.2 grams of aluminum was then evaporated onto the glass from another tungsten electrode. This gave a coating of aluminum on top of the aluminum oxide which amounted to .044 gram aluminum per square foot and was 0.1750 micron thick. To all appearances, the mirror thus produced was identical with a mirror produced by directly evaporating 2.2 grams of aluminum onto glass, the reflectivity in each case being 89%. However, the mirror produced with the oxide layer next to the glass was tightly adherent and the simple aluminum mirror was relatively poor in adhesion.

*Example 2*

In a further example, a silver mirror was made in which 0.007 gram of aluminum were evaporated within a vacuum from a tungsten coil onto glass set at 12 inches from the tungsten coil and at 24 inches away. The aluminum deposit on the glass 12 inches away from the tungsten burner was .0023 micron thick while that formed on the glass 24 inches away from the tungsten burner was obviously thinner and .0006 micron thick. These aluminum deposits were then converted into aluminum oxide as more particularly set forth in co-pending applications Serial Nos. 541,965 and 541,966, by introducing oxygen into the vacuum until a pressure of 0.01 to 0.02 millimeter was developed and then an electric glow discharge of 15,000 volts was caused to pass through the vacuum chamber and to play upon the surface of the glass. This rapidly converted the thin aluminum films into aluminum oxide, 5 minutes being entirely sufficient to do this. These films would appear to be about .0030 and .0008 micron thick. The vacuum pumps were then again started and after again securing a vacuum of 10 to the minus 5 millimeters, there was evaporated from other tungsten coils or filaments approximately 5.0 grams of silver, which gave a deposit upon the glass placed 24 inches away of 0.1 gram of silver per square foot of area, and a deposit 4 times as thick again on the glass placed 12 inches from the burners or filaments. The silver layer thus produced on the glass placed 24 inches away was approximately 0.1050 micron thick. As second surface mirrors the two mirrors produced showed a reflectivity of 91% in the latter case and the mirror made 12 inches away from the tungsten electrodes and having a slightly thicker aluminum oxide layer on the glass showed a reflectivity of 88%. A reflectivity of 91% is the maximum secured with a second surface silver mirror made by thermal evaporation and not using our oxide layers on the glass. Moreover, it is to be understood that good adhesion was secured, the deposits not being removed from the glass by adhesive tape in contrast to the easy stripping secured with ordinary silver mirrors.

*Example 3*

A silver mirror was made by first evaporating within a high vacuum 0.011 gram of silver onto a glass placed 24 inches away from the tungsten filament. This gave a silver coating 2.2 Angstrom units thick or .00022 micron thick. The silver was then converted into an invisible silver oxide film by introducing air up to a pressure sufficient to permit an electric glow discharge to occur within the vacuum chamber. After several minutes' operation of the glow discharge the silver film was converted into silver oxide. Thereafter the chamber was again highly evacuated and from other tungsten filaments, sufficient silver was evaporated to give a silver coating on the glass of 0.1 gram per square foot. This silver mirror showed extremely high adhesion and the coating could not be removed from the glass by adhesive tape. The reflectivity of the mirror either as a first surface or second surface mirror was equal to that of a silver mirror, namely 95% as a first surface and 91% as a second surface mirror. The coating of silver oxide thus used is only 1 to 2 atoms thick, being approximately 3.3 Angstrom units thick. Obviously, the thickness of this film is negligible compared to the dimensions of visible light rays which is the yellow measure 5000 Angstrom units. Consequently, it is not surprising that such a deposit as was used in this example had no optical effect, while exerting a desirable high increase in adhesion.

*Example 4*

0.0082 gram of yellow lead oxide were evaporated from a tungsten filament onto a piece of glass 24 inches away within a high vacuum chamber. The lead oxide was evaporated directly in a high vacuum of about 10 to the minus 2 millimeters, or better, and gave a coating on the glass approximately 0.0002 micron thick. This coating could not be seen nor did it affect the light transmission of the glass. 8.6 grams of silver, 2.2 grams of aluminum, 7.25 grams of copper, or 5.8 grams of chromium was then thermally evaporated onto this prepared glass and in each case the first and second surface mirrors showed the normal characteristic reflection values and properties of the ordinary mirrors made from these metals not having the lead oxide film. In each case, however, the mirrors were very tightly adherent, and in each of these mirrors the lead oxide film next to the glass was .0002 micron thick and the metallic reflective layers were 0.1750 micron thick.

*Example 5*

Using a lead oxide coated plate produced as just above, there was deposited on such a piece of glass sufficient silver to produce a coating of .04 gram per square foot and of about .040 micron thickness. This gave a semi-transparent mirror showing a reflectivity of 84% and a light transmission of 9%, which is identical with that secured in similar deposits on glass without the lead oxide coating. The silver mirror produced was tightly adherent.

*Example 6*

Working within a high vacuum chamber with the glass piece placed 14 inches away from the tungsten heater filaments, there was evaporated onto the glass 0.004 gram of lead which was thereafter converted into lead oxide by exposure to air. The lead film, before converting to the oxide, was about .0022 micron thick and the lead oxide film should have been about .0029 micron in thickness. When this was coated with silver by thermal evaporation sufficient to give a deposit of 0.1 gram per square foot, the second surface reflectivity of the silver mirror produced was 91%. In this case no loss in reflectivity was experienced although an extreme improvement in adhesion was secured. We may also apply the silver layer by sputtering silver onto the lead oxide coated sheets. Similar results are secured if the lead oxide coated sheets are silvered or mirrored by ordinary chemical deposition methods, as by pouring an alkaline mixture of silver nitrate and invert sugar on the precoated sheets.

*Example 7*

Whereas the lead oxide film used in this last example was invisible, a lead oxide film similarly produced at the same distance in the same vacuum chamber by the evaporation of 0.015 gram of lead was visible as a very slight yellowish tinge upon the glass. When silver to the amount of 0.1 gram per square foot was deposited upon this coating by thermal evaporation, the reflectivity of the second surface silver mirror produced was found to be 85%. Thus, the lead oxide film which was about .0108 micron thick did in this case decrease the reflection but its use gave a tightly adherent mirror capable of standing prolonged salt spray tests. By the use of even thicker films of lead oxide there is not found any further improvement in adhesion but as the lead oxide films become thicker there is a greater absorption of light. Thus, evaporating 0.036 gram of lead and converting this into lead oxide, gave a lead oxide film of 0.0260 micron thickness and there was a distinct yellowish color produced upon the glass. When this was then coated with silver to the amount of 0.1 gram per square foot, the silver mirror produced had a reflectivity of 77%. In producing the lead oxide film in this example, the lead was preferably converted into lead oxide by operating an electric glow discharge in an oxygen or air atmosphere at .02 millimeter for about 20 minutes or the lead-coated plates may be heated a short time in an oven at 100° C. or higher.

Example 8

A particularly adherent mirror suitable for outside use as store fronts was produced by the deposition upon an opaque colored Vitrolite glass, made by Libbey-Owens-Ford Glass Company, at a distance of 14 inches away from a tungsten filament of .005 gram of tin to give a coating of .000,292 gram per square foot or of .000,000,314 gram per square centimeter. The tin was then converted into oxide either by exposing the coated plate to normal air or by glowing the same with an electric glow discharge in an air or oxygen atmosphere at around .02 millimeter pressure. On top of this tin oxide layer which was about 5 Angstrom units thick there was deposited 3.5 grams of chromium to give a mirror which had all the optical properties of an ordinary chromium mirror of the same chromium thickness. The thickness of the chromium layer in this case was 0.1060 micron. This was completely etched away by known methods in portions to present the chromium mirror and colored glass in contrasting design.

Example 9

0.010 gram of lead sulfide were evaporated in a high vacuum directly upon pieces of silica, mica, borosilicate glass, lead glass, and ordinary glass placed 24 inches away from the thungsten filament carrying the lead sulfide and upon the coated glass pieces thus secured, there showed no visible signs of any deposit. There was thermally evaporated immediately within the same vacuum upon this glass, an opaque deposit of aluminum. The first surface aluminum mirrors produced in each case showed a reflectivity of 89% and were very tightly adherent. The lead sulfide preliminary coating amounted to .0001 gram per square foot of area and was about .0003 micron thick.

Example 10

An ordinary piece of glass was coated as under the last example, but the amount of lead sulfide evaporated was .025 gram. After the evaporation, air was let into the tank and after a few moments the vacuum pumps were again started and aluminum was then thermally deposited as before. This gave a similar mirror to the last prepared glass mirror in which the aluminum was adhered to the glass by a thin film of lead sulfate formed by oxidation of the lead sulfide. The lead sulfate layer would appear to have been of about .0011 micron thickness. The oxidation of the lead sulfide layer to lead sulfate may also be accomplished without removing the piece from the vacuum chamber, by introducing air or oxygen into the chamber after the lead sulfide has been deposited, until a sufficient pressure has been built up which will permit an electric glow discharge to pass through the gases within the chamber. After a short time the electric glow discharge, in combination with the oxygen present, converts the lead sulfide to lead sulfate.

Example 11

As a further example, 0.002 gram of zinc was evaporated from a tungsten filament onto glass placed 14 inches away from the tungsten burner. Oxygen was then introduced to produce a pressure between one millimeter and 0.02 millimeter, and electric glow discharge was set up between an aluminum electrode in the center of the chamber and the walls of the chamber, by the application of 5000 to 30,000 volts of electricity at approximately one to 5 kva. After a few minutes operation of the glow discharge, the extremely thin deposit of zinc was converted into a zinc oxide layer 22 of about .0004 micron thickness. A silver electrode was then energized by a high potential electric current so as to cause silver to be sputtered on top of the zinc oxide coated glass. After a sufficient amount of silver 23 had been deposited the mirror coated glass or the like 21 was found to be directly applicable for use as an electric resistance by attaching suitable conducting leads 24 to this silver film 23, as seen in Figure 7 of the drawings. Pieces of this glass were also further coated by thermal evaporation preferably within a higher vacuum with a further layer of copper oxide 25 to produce a photo-electric cell, shown as a whole at 20, when suitably mounted within a case 20a and when the conducting silver backing of the copper oxide was attached to suitable electrically conducting leads 24.

Both of the articles produced as just described in Example 11 were found to be highly serviceable due to the high degree of adhesion secured, whereas in the past, it has not been possible to make such articles from silver although its high electrical conductivity made this desirable because the silver films in practical commercial use soon separated from the glass because of lack of adhesion.

Example 12

A thin film of magnesium fluoride 0.0009 micron thick was deposited upon a support of glass by thermal evaporation and thereafter a layer of silver of 0.0900 micron thickness was similarly deposited by thermal evaporation. This gave a strongly adherent silver mirror which could not be pulled off the glass by adhesive tape. While the thin magnesium fluoride film gave a high degree of adhesion to the mirror it did not interfere with or alter the reflective properties of the silver mirror as contrasted with similar mirrors made without such film.

Example 13

A film of silver chloride 0.0025 micron thick was evaporated upon pieces of glass within a high vacuum. These glass pieces were then placed upon a chemical silvering table and silvered by pouring thereon a suitable freshly made mixture of caustic soda, silver nitrate and invert sugar which precipitated thereon an opaque reflective deposit of silver in accordance with the well known means of producing silver mirrors. The second surface silver mirror produced had a reflectivity of approximately 92% and in contrast to the ordinary chemical silver mirrors the silver film could not be stripped away from the glass by adhesive tape. This silver mirror also showed remarkably improved resistance to salt spray as compared with ordinary chemical silver mirrors. In a similar way other chemical silver or other chemically deposited mirrors may be made which are of high adhesion using a precoated glass carrying one of our desired metallic compounds. It is necessary, of course, to choose as the metallic compound to be used on the glass one which is not soluble in the chemical solutions used for producing the mirrors. Thus, we have used silver chloride in the above example as it is not soluble in the solutions used. Thus, we may also have used in this way glasses which were precoated with silver oxide.

Example 14

A porcelain vase as shown in Figures 5 and 6 of the drawings was placed within a small furnace in the bottom portion of which a container carrying lead chloride was placed. The temperature of the furnace was gradually raised to bring the same to 1000° C. or slightly above. At these temperatures the lead chloride volatilizes and after the furnace was again cooled a thin coating of lead chloride condensed all over the surfaces of the bowl. The bowl was then placed in a high vacuum chamber and an opaque deposit of gold was then evaporated onto the surfaces of the bowl by thermal evaporation. The gold coating was then found to be highly adherent to the porcelain bowl whereas similar bowls coated directly with gold did not give a commercial article in that the gold soon became detached and even tended to rub off. The thin lead chloride film acts as a strong adhesive cementing the metallic gold to the siliceous porcelain surface of the bowl. Many similar articles can be produced in such ways.

Example 15

Plates of glass were placed within a furnace and raised to a temperature exceeding 500° C. A small amount of arsenic oxide was then blown into the furnace and at these temperatures it completely evaporates. On cooling the furnace down the arsenic oxide deposited a thin film on the glass. We have found such glass prepared with arsenic oxide or other metallic compound layer to be extremely satisfactory for applying metallic deposits thereto by the hot spray gun type of process. Thus, with a suitable spray gun we may introduce copper wire through a flame and melt and atomize the copper and project it as a molten spray upon the glass which we have previously coated with arsenic oxide or other desired metallic compound material. The glass thus coated with copper may be applied for a number of uses, as for example, in burglar-proof alarms where the copper areas upon the glass carry a suitable electric current which is interrupted when the glass window or other area becomes broken. The copper or other metals thus applied are extremely adherent to the glass and thereby more weather resistant and suitable for such services.

Example 16

Clean glass pieces were coated with a layer of lead oxide 0.0002 micron thick as under Example 4 and other pieces were coated in another chamber with lead sulfide 0.0003 micron thick as in Example 9 by the direct thermal evaporation of these materials. In each case after these metallic compounds had been deposited on the glass by thermal evaporation there was then evaporated thereon within the respective chambers without breaking the vacuums, a reflective coating of rhodium. In contrast to similar deposits of rhodium made directly onto glass which are very poor in adhesion and undependable, our mirrors were of high adhesion and high service life. The intermediate coatings were transparent, invisible and without optical effect, the first and second surface reflectivities equalling good rhodium mirrors.

Mirrors or other light reflective or partially light reflective and partially light transparent articles constructed in accordance with the disclosure herein exhibit very great resistance to separation of the metal film from the support body, and this is accomplished without in any way detracting from optical properties exhibited by similar articles previously produced without the inclusion of the improved bonding layer. In the foregoing specification mention has been made of the fact that the bonding layer is deposited upon a smoth surface of a support body. In this connection it may be stated that the term "smooth surface" is used in its ordinary sense and need be only sufficiently smooth to prevent visible or optically apparent light diffusion at the surface. However, the present invention contemplates that the specific smoothness of the surface of the support body will be reproduced in the outer surface of the bonding layer and will also result in interfaces at opposite sides of the bonding layer between the bonding layer and the support body and between the bonding layer and the metal film of substantially the same smoothness as the smoothness of the smooth surface of the support body. Thus if the smooth surface of the support body is polished to have an extremely smooth finish, this finish will be reproduced in the interfaces between the bonding layer and the support body, between the bonding layer and the metal reflecting film, and also at the outer surface of the metal reflecting film. Accordingly, the present invention results in an article which reflects light or which partially reflects and partially transmits light in a manner to show no additional visible diffusion due to the provision of the intermediate bonding layer. If the critical surface or surfaces of the support body are highly polished, both of the interfaces at opposite sides of the bonding layer will exhibit substantially the same property of smoothness and in addition the outer surfaces of the metal film will exhibit substantially the same property of smoothness.

So that there can be no misunderstanding as to the use herein of the term "siliceous material," we submit below a definition of this term:

The adhesive effects are secured upon silica, silicates such as mica which contains silica, aluminum silicate or calcium silicate surfaces, and upon the various types of glass which contain different amounts of silica. Thus, with the lead glasses which have 30 to 60 per cent silica, with the optical glasses of 50 per cent silica or more, the ordinary lime glasses of around 65 to 75 per cent silica, and with the borosilicate glasses of as high as 80 percent silica, we secure equally as good results as are found with pure silica. Since the adhesive layer is deposited on a smooth surface of the support body, and the metal film is deposited on the smooth surface of the adhesive layer without the possibility of intermingling or mechanically interlocking in either case, and since the possibility of chemical reaction between the solid adhesive layer and the solid vitreous siliceous material and the solid metal of the film is eliminated, it is apparent that the extremely effective adhesion obtained is primarily the result of inherent molecular forces of attraction between the materials. Likewise, the commercial porcelain and earthenware articles which contain varying amounts of silica in the ware or in the glazes provide suitable support bases to which metallic films may be adhered by use of our metallic compounds.

Having thus described our invention, what we claim is:

1. A bonded mirror comprising a vitreous siliceous support body having a smooth continuous surface; a continuous intermediate metal oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a metal reflecting film permanently and directly adhered by molecular forces to said metal oxide adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

2. A bonded mirror comprising a vitreous siliceous support body having a smooth continuous surface; a continuous intermediate metal oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and an aluminum reflecting film permanently and directly adhered by molecular forces to said metal oxide adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

3. A bonded mirror comprising a vitreous siliceous support body having a smooth continuous surface; a continuous intermediate metal oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a silver reflecting film permanently and directly adhered by molecular forces to said metal oxide adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

4. A bonded mirror comprising a vitreous siliceous support body having a smooth continuous surface; a continuous intermediate aluminum oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a metal reflecting film permanently and directly adhered by molecular forces to said aluminum oxide adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

5. A bonded mirror comprising a vitreous siliceous support body having a smooth continuous surface; a continuous intermediate aluminum oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and an aluminum reflecting film permanently and directly adhered by molecular forces to said aluminum oxide adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body.

6. A bonded second surface mirror comprising a transparent vitreous siliceous support body having a smooth continuous rear surface; a substantially transparent continuous intermediate metal oxide adhesive layer permanently and directly adhered by molecular forces to the rear surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said rear surface of the support body; and a metal reflecting film permanently and directly adhered by molecular forces to said metal oxide adhesive layer, the adjacent surfaces of said adhesive layer and said reflecting film being intimate continuous surface to surface contact and defining a smooth continuous interface.

7. A bonded article comprising a transparent vitreous siliceous support body having a smooth continuous surface; a substantially transparent continuous intermediate metal oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a partially transparent, partially reflecting film of metal permanently and directly adhered by molecular force to said metal oxide adhesive layer, the adjacent surfaces of said adhesive layer and said film being in intimate continuous surface to surface contact and defining a smooth continuous interface, the other surface of said film being of substantially the same smoothness as the said smooth surface of the support body.

8. A bonded second surface mirror comprising a transparent vitreous siliceous support body having a smooth continuous rear surface; a continuous, intermediate, transparent, invisible colorless metal oxide adhesive layer permanently and directly adhered by molecular force to the rear surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said rear surface of the support body; and a metal reflecting film permanently and directly adhered by molecular forces to said metal oxide adhesive layer, the adjacent surfaces of said adhesive layer and said reflecting film being in intimate continuous surface to surface contact and defining a smooth continuous interface, said adhesive layer being of a thickness invisible to the naked eye and without optical or color effect upon the transmission and reflection characteristics of the mirror.

9. A bonded article comprising a vitreous siliceous support body having a smooth continuous surface; a continuous intermediate metal oxide adhesive layer permanently and directly adhered by molecular forces to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a metal film permanently and directly adhered by molecular forces to said metal oxide adhesive layer, the adjacent surfaces of said adhesive layer and said film being in intimate continuous surface to surface contact and defining a smooth continuous interface, the other surface of said film being of substantially the same smoothness as the said smooth surface of the support body.

10. A bonded mirror comprising a vitreous siliceous support body having a smooth continuous surface; a continuous intermediate metal oxide adhesive layer permanently and directly adhered to the smooth continuous surface of said support body without intermingling into the material of the support body, the adjacent surfaces of said support body and said adhesive layer being in intimate continuous surface to surface contact and defining a smooth continuous interface, the other surface of said adhesive layer being of substantially the same smoothness as the said smooth surface of the support body; and a metal reflecting film permanently and directly adhered to said metal oxide adhesive layer, the adjacent surfaces of said adhesive layer and said reflecting film being in intimate continuous surface to surface contact and defining a smooth continuous interface, the other surface of said reflecting film being of substantially the same smoothness as the said smooth surface of the support body, the intermediate metal oxide layer constituting the sole material between the support and metal film and adhering said support and metal film together.

WILLIAM H. COLBERT.
ARTHUR R. WEINRICH.
WILLARD L. MORGAN.

REFERENCES CITED

The following references are of record in the file of this patent:

UNITED STATES PATENTS

| Number | Name | Date |
|---|---|---|
| Re. 22,076 | Cartwright et al. | Apr. 21, 1942 |
| 1,008,902 | Haehnel | Nov. 14, 1911 |
| 1,698,307 | La Hodny | June 8, 1929 |
| 1,884,665 | Greiner | Oct. 25, 1932 |
| 2,010,145 | Eitel | Aug. 6, 1935 |
| 2,030,476 | Smith | Feb. 11, 1936 |
| 2,047,351 | Alexander | July 14, 1936 |
| 2,278,722 | Loiseleur | Apr. 7, 1942 |
| 2,304,182 | Land | Dec. 8, 1942 |
| 2,394,930 | McRae | Feb. 12, 1946 |

FOREIGN PATENTS

| Number | Country | Date |
|---|---|---|
| 508,205 | Great Britain | Dec. 7, 1938 |

OTHER REFERENCES

American Physical Society, vol. 14, #2, April 1939, page 24.